No. 672,216. Patented Apr. 16, 1901.
G. W. MITCHELL.
LIFE PRESERVER.
(Application filed Aug. 21, 1900.)
(No Model.)
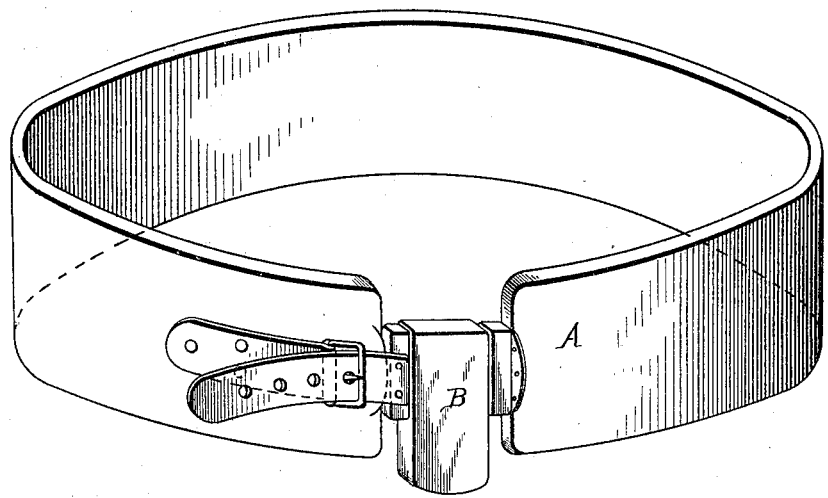
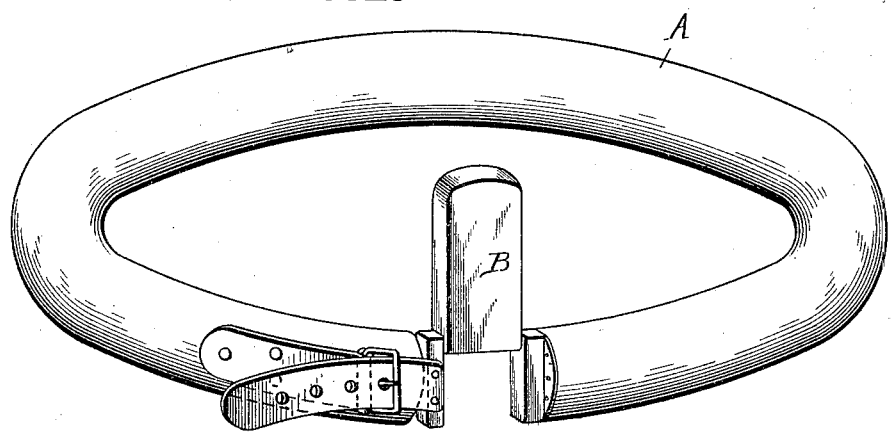
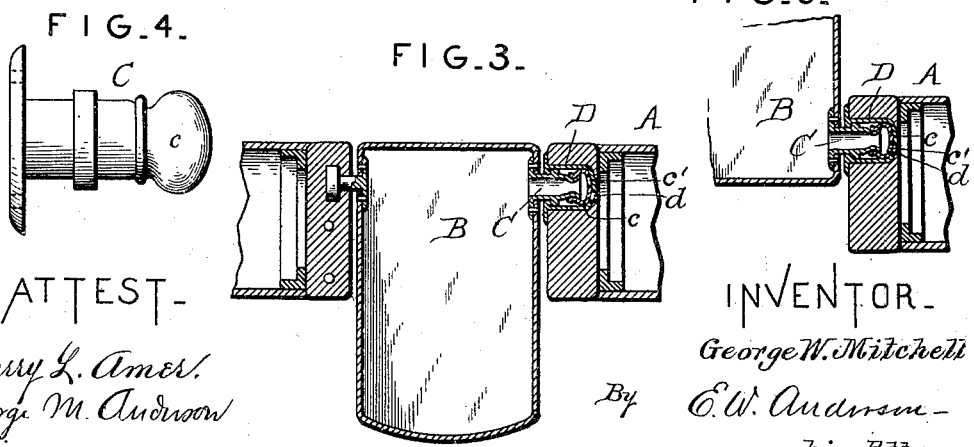
ATTEST-
Harry L. Ames.
George M. Anderson
INVENTOR-
George W. Mitchell
By E. W. Anderson
his Atty.

United States Patent Office.

GEORGE W. MITCHELL, OF LUNENBURG, CANADA.

LIFE-PRESERVER.

SPECIFICATION forming part of Letters Patent No. 672,216, dated April 16, 1901.

Application filed August 21, 1900. Serial No. 27,636. (No model.)

*To all whom it may concern:*

Be it known that I, GEORGE W. MITCHELL, a citizen of the Dominion of Canada, and a resident of Lunenburg, in the county of Lunenburg and Province of Nova Scotia, Canada, have made a certain new and useful Invention in Life-Preservers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of my invention with float down and belt collapsed. Fig. 2 is a similar view with float up and valve inflated. Fig. 3 is a sectional view of float and valve, float being down and valve closed. Fig. 4 is a detail side elevation of the valve. Fig. 5 is a view similar to Fig. 3, showing the float raised and valve open.

This invention has relation to life-preservers; and it consists in the novel construction and combinations of parts, as hereinafter set forth.

In the accompanying drawings, illustrating the invention, the letter A designates a life-preserver made in the form of a belt of suitable air-tight and water-proof material of flexible character, such as rubber cloth. The two ends of this belt are provided with suitable fastening devices, and adjacent thereto is provided a depending float B, which is provided at its upper end portion with pivotal bearings in the belt, being arranged to swing upwardly into vertical position when immersed in water. This float is hollow, being designed to act as a reservoir for compressed air or other gas and having a communication with the interior of the belt A, which communication is closed when the float hangs in its normal position, the wearer of the belt, which is designed for constant wear, being safe on land or shipboard, but which communication is open when the float is raised or swung upwardly when immersed in water should the wearer fall overboard.

The communication above referred to of float-reservoir and belt is as follows: One of the journals C, upon which this reservoir is pivoted, is tubular and provided at its end portion with a cap or diaphragm c, of flexible material, preferably rubber, having an opening c' therethrough eccentrically thereof. The tubular boxing D, in which this journal (which moves with the float) works, is provided likewise with an eccentric opening d, leading into the interior of the life-belt. These two openings of diaphragm and boxing are arranged to be out of line or communication when the float is out of the water, but upon lifting of the float in water are arranged to be brought in register to establish a free exit for the compressed gas in the float into the belt to inflate the same and support the wearer upon the surface of the water.

It will be noted that the flexibility of diaphragm c will under the influence of the compressed gas when the openings c' and d are out of register cause an entire closing of the communication between reservoir and belt.

Having thus described my invention, what I claim as new, and desire to secure by Letters Patent, is—

1. An inflatable life-belt, provided with a compressed-gas reservoir, having a communication which is normally closed with the interior of said belt, and a float operating to open said communication automatically when immersed in water, substantially as specified.

2. An inflatable life-belt, provided with a float pivoted thereto, and adapted to act as a reservoir for compressed gas, said float having a communication which is normally closed with the interior of said belt, and means for opening said communication upon pivotal movement of said float when immersed in water, substantially as specified.

3. An inflatable life-belt, provided with a pivoted float and compressed-gas reservoir, one of the journals of said float being tubular and provided with an eccentric opening through an end wall thereof, the boxing for said tubular journal also having an eccentric opening in an end wall thereof, said openings being arranged to be brought into and out of register under pivotal movement of said float, substantially as specified.

4. An inflatable life-belt, provided with a pivoted float and compressed-gas reservoir, one of the journals of said float being tubular and provided with a flexible end wall having an eccentric opening therethrough, the boxing for said tubular journal also having an eccentric opening through an end wall thereof, said openings being arranged to be brought into and out of register under pivotal movement of said float, substantially as specified.

In testimony whereof I affix my signature in presence of two witnesses.

GEORGE W. MITCHELL.

Witnesses:
   H. H. MacIntosh,
   S. A. Rounsefell.